United States Patent
Borean et al.

(10) Patent No.: US 8,719,693 B2
(45) Date of Patent: May 6, 2014

(54) METHOD FOR STORING LOCALIZED XML DOCUMENT VALUES

(75) Inventors: David Borean, Aurora (CA); Michael Cobbett, Eastleigh (GB); Patrice Pominville, Brisbane, CA (US)

(73) Assignee: International Business Machines Corporation, Armonk, NY (US)

( * ) Notice: Subject to any disclaimer, the term of this patent is extended or adjusted under 35 U.S.C. 154(b) by 1190 days.

(21) Appl. No.: 12/035,650

(22) Filed: Feb. 22, 2008

(65) Prior Publication Data
US 2009/0217156 A1 Aug. 27, 2009

(51) Int. Cl.
*G06F 17/00* (2006.01)

(52) U.S. Cl.
USPC .......................................... 715/234; 715/237

(58) Field of Classification Search
CPC ........................ G06F 17/2247; G06F 17/2705
USPC ........ 715/264, 265, 234; 704/8; 434/156, 157
See application file for complete search history.

(56) References Cited

U.S. PATENT DOCUMENTS

| | | | |
|---|---|---|---|
| 6,934,908 B2 * | 8/2005 | Fox et al. ....................... | 715/234 |
| 7,207,001 B2 | 4/2007 | Bailey et al. | |
| 7,207,005 B2 * | 4/2007 | Lakritz .......................... | 715/201 |
| 7,284,199 B2 * | 10/2007 | Parasnis et al. ................ | 715/201 |
| 7,305,376 B2 | 12/2007 | Wu et al. | |
| 7,392,243 B2 * | 6/2008 | Brown et al. ......................... | 1/1 |
| 7,447,624 B2 * | 11/2008 | Fuhrmann ......................... | 704/8 |
| 7,496,596 B2 * | 2/2009 | Li et al. .................................. | 1/1 |
| 7,571,092 B1 * | 8/2009 | Nieh ................................ | 704/2 |
| 7,747,588 B2 * | 6/2010 | Thompson et al. ............ | 707/694 |
| 7,774,321 B2 * | 8/2010 | Tomic et al. ................... | 707/690 |
| 7,784,026 B1 * | 8/2010 | Wong ............................. | 717/109 |
| 7,797,349 B2 * | 9/2010 | Kosaka .......................... | 707/802 |
| 2002/0162093 A1 * | 10/2002 | Zhou et al. .................... | 717/130 |
| 2004/0006744 A1 * | 1/2004 | Jones et al. .................... | 715/514 |
| 2004/0083219 A1 * | 4/2004 | Hu et al. ........................ | 707/100 |
| 2004/0122659 A1 * | 6/2004 | Hourihane et al. ................ | 704/9 |
| 2004/0181544 A1 * | 9/2004 | Anderson ...................... | 707/102 |
| 2004/0268306 A1 | 12/2004 | Cheng et al. | |
| 2005/0038816 A1 * | 2/2005 | Easton ........................ | 707/104.1 |
| 2005/0097455 A1 * | 5/2005 | Zhou et al. .................... | 715/513 |
| 2005/0177543 A1 * | 8/2005 | Chen et al. ......................... | 707/1 |
| 2005/0262440 A1 * | 11/2005 | Stanciu et al. ................. | 715/523 |

(Continued)

OTHER PUBLICATIONS

Fallside et al., XML Schema Part 0: Primer Second Edition, Oct. 28, 2004, W3C.*

(Continued)

*Primary Examiner* — Adam M Queler
*Assistant Examiner* — Howard Cortes
(74) *Attorney, Agent, or Firm* — Lieberman & Brandsdorfer, LLC

(57) ABSTRACT

A method and apparatus are provided to create a parent XSD document that separately identifies localized data and non-localized content definitions. A tool is employed to parse the localized content definitions from the non-localized content definitions. The parsing tool generates a child XSD document pertaining to the localized content definitions identified within the parent XSD document. One or more child XML documents are created to store data pertaining to the localized content definitions of the child XSD document. Localized content is isolated in a child XML document that is governed by a corresponding child XSD document, wherein the corresponding child XSD document is derived from the parent XSD document. Just as with any other XML document, the localized content in the isolated child XML document is supported by querying and validation by XML tools.

17 Claims, 3 Drawing Sheets

(56) References Cited

U.S. PATENT DOCUMENTS

| | | |
|---|---|---|
| 2006/0004729 A1* | 1/2006 | Zhilyaev et al. ............. 707/3 |
| 2006/0287844 A1* | 12/2006 | Rich .......................... 704/2 |
| 2007/0055694 A1 | 3/2007 | Ruge et al. |
| 2007/0061350 A1* | 3/2007 | Thompson et al. ........ 707/101 |
| 2007/0073544 A1 | 3/2007 | Millett et al. |
| 2007/0208997 A1 | 9/2007 | Jiang et al. |
| 2007/0233456 A1* | 10/2007 | Kim ............................ 704/2 |
| 2008/0082965 A1* | 4/2008 | Atkin et al. ................ 717/118 |
| 2008/0103830 A1* | 5/2008 | Apacible et al. ............ 705/3 |
| 2008/0288239 A1* | 11/2008 | Bailey et al. ................. 704/2 |
| 2009/0119319 A1* | 5/2009 | Li et al. ..................... 707/100 |
| 2009/0177733 A1* | 7/2009 | Talker ....................... 709/203 |
| 2009/0217156 A1* | 8/2009 | Borean et al. ............. 715/234 |
| 2011/0010351 A1* | 1/2011 | Szimmetat et al. ......... 707/695 |
| 2011/0119676 A1* | 5/2011 | Gallant ..................... 718/104 |

OTHER PUBLICATIONS

User and Reference Manual, XMLSPY 5 Enterprise Edition, 2003, Altova.*

Fallside et al., XML Schema Part O: Primer Second Edition, Oct. 28, 2004, W3C.*

Ayesha Malik, Create flexible and extensible XML schemas, IBM developerWorks, Oct. 2002.*

Tseng et al., "Integrating Heterogeneous Data Warehouses Using XML Technologies," Journal of Information Science, 2005, pp. 209-229.

* cited by examiner

METHOD FOR STORING LOCALIZED XML DOCUMENT VALUES

BACKGROUND OF THE INVENTION

1. Technical Field

This invention relates to categorizing data in an XSD document, and parsing the data based upon the categories assigned thereto. More specifically, the invention relates to managing data in a related XML document by creating separate XML documents, with the separate XML documents being directly related to the categorized data in the XSD document.

2. Description of the Prior Art

As increasingly more information becomes available online, automated tools for publishing information in a variety of formats become increasingly important. One such tool for imposing structure on information that is commonly employed is the extensible markup language, also known as XML. XML (Extensible Markup Language) is a flexible way to create common information formats and share both the format and the data on the World Wide Web, intranets, and elsewhere. It is a human readable way of describing structured data. For example, computer makers might agree on a standard or common way to describe the information about a computer product (processor speed, memory size, and so forth) and then describe the product information format with XML. Such a standard way of describing data would enable a user to send an intelligent agent (a program) to each computer maker's Web site, gather data, and then make a valid comparison. XML can be used by any individual or group of individuals or companies that wants to share information in a consistent fashion.

XML is similar to the language of today's Web pages, the Hypertext Markup Language (HTML). Both XML and HTML contain markup symbols to describe the contents of a page or file. HTML, however, describes the content of a Web page (mainly text and graphic images) only in terms of how it is to be displayed and interacted with. For example, the letter "p" placed within markup tags starts a new paragraph. XML describes the content in terms of what data is being described. More specifically XML allows designers to create their own customized tags, enabling the definition, transmission, validation, and interpretation of data between applications. In another example, the word "phonenum" placed within markup tags could indicate that the data that followed was a phone number. This means that an XML file can be processed purely as data by a program or it can be stored with similar data on another computer or, like an HTML file, it can be displayed. For example, depending on how the application in the receiving computer wanted to handle the phone number, it could be stored, displayed, or dialed.

XML is "extensible" because, unlike HTML, the markup symbols are unlimited and self-defining. XML is actually a simpler and easier-to-use subset of the Standard Generalized Markup Language (SGML), the standard for how to create a document structure. It is expected that HTML and XML will be used together in many Web applications. XML markup, for example, may appear within an HTML page.

XML Schema Definition, known as XSD, specifies how to formally describe the elements in an Extensible Markup Language (XML) document. XSD is written in XML. This description can be used to verify that each item of content in a document adheres to the description of the element in which the content is to be placed. In general, a schema is an abstract representation of an object's characteristics and relationship to other objects. An XML schema represents the interrelationship between the attributes and elements of an XML object, such as a document or a portion of a document. To create a schema for a document, you analyze its structure, defining each structural element as you encounter it. For example, within a schema for a document describing a Web site, you would define a Web site element, a Web page element, and other elements that describe possible content divisions within any page on that site. Just as in XML and HTML, elements are defined within a set of tags.

There is a growing need for applications to process and maintain semi-structured hierarchical data governed by a flexible data model. XML is the technology of choice used to achieve this need. XML is often used with XSD, wherein XSD is used to validate XML documents, enforce a certain structure, and validate individual data elements in the XML document. However, with the advent of globalization, there is also a growing need to maintain localized values for data in a plurality of languages. One solution known in the art is to store localized values side-by-side in the original XML document. Storing values side-by-side increases the size of the document, and also incurs changes to the format of the data. Accordingly, this solution results in bloating the original document with the localized values, thereby increasing the size of the original document which affects performance associated with processing, as well as modifying the structure of the original document.

Another known solution for addressing maintenance of a plurality of localized values is to assign unique identifiers to the data values in the XML document and have a separate file, also known as a flat file, to store the identifier and the associated value file. The flat file is not an XML structured document. Therefore the values stored in the flat file cannot be validated using XSD validation. Accordingly, there are limitations associated with the prior art solutions for addressing assignment and storage of a plurality of localized values in an XML structured document.

Therefore, there is a need for a solution that maintains a plurality of localized values in an XML structured document, while mitigated the act of bloating the original document with localized values. The solution needs to maintain the benefits associated with the XML structure as the original document is an XML document. In other words, the solution needs to maintain the benefits of the XML structure while addressing the needs for the localized values.

SUMMARY OF THE INVENTION

This invention comprises a method, apparatus, and article of manufacture for storing localized values of data in a separate XML document.

In one aspect of the invention, a method is provided for storing localized values referenced in an XSD document in a separate XML document. More specifically, a first XSD document is created for a first XML document. The first XSD document includes both at least one localized content definition and at least one non-localized content definition. All localized content definitions in the first XSD document are identified. Following the identification of all localized content definitions, the first XSD document is processed to create a derived XSD document. The step of processing the first XSD document extracts only the identified localized content definitions. A localized value for each identified localized content definition for the derived XSD document is stored in a separate XML document.

In another aspect of the invention, a computer system is provided with a processor in communication with memory and storage media. An XSD creation tool is provided in communication with the processor. The XSD creation tool is employed to create a first XSD document for a first XML document. The first XSD document includes at least one localized content definition and at least one non-localized content definition. In addition, an XSD processing tool is provided in communication with the processor. The XSD processing tool identifies all localized content definitions in the first XSD document and creates a second XSD document. The XSD processing tool extracts only the identified localized content definitions. An editor is provided in communication with the processor to create a second XML document and to store a localized value for each identified localized content definition in the second XML document.

In yet another aspect of the invention, an article is provided with a computer readable carrier including computer program instructions configured to store localized content definitions in an XML document. Instructions are provided to create a first XSD document for a first XML document. The first XSD document includes localized content and non-localized content definitions. Instructions are also provided to identify all localized content definitions in the first XSD document and to process the first XSD document to create a second XSD document. The process instructions for the first XSD document extracts all identified localized content definitions. Instructions are also provided to store a localized value for each identified localized content in the second XML document.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

A parent XSD document is created with localized data definitions and non-localized data definitions separately identified. A tool is employed to parse the localized data definitions from the non-localized data by generating a child XSD document pertaining to the localized data definitions identified in the parent XSD document. The child XSD document is separate from the parent XSD document, although related to it. One or more child XML documents may be created to store data conforming to the localized data definitions of the child XSD document. Localized content is isolated in a child XML document that is governed by a corresponding child XSD document, wherein the corresponding child XSD document is derived from the parent XSD document. The localized content in the isolated child XML document is supported by querying and validation by XML tools, as any other XML document. Accordingly, the localized content is parsed from the non-localized content in a manner to isolate the localized content for purpose of manageability thereof.

Technical Details

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

An XML document contains elements, attributes, and values of primitive data types. XML documents often need a well defined structure in order to be portable across platforms and development systems. One way to accomplish this is by developing an XML Schema Definition (XSD). The purpose of an XSD is to describe a class of XML documents using XML markup constraints to document the usage and relationship of their underlying foundations, such as elements, data types and content. The related XSD schema defines elements, attributes, and the relationship between the data types of the XML document. XML documents are human readable, text representations of data. It is known in the art to create XSD documents and corresponding XML documents through use of an editor. Furthermore, it is known in the art, that the corresponding XSD document may be employed to validate the data entered into the corresponding XML document. More specifically, the validation process checks whether the data of the XML document is well formed and adjusted to a defined structure. A well formed document follows the basic rules of XML established for the design of documents. Moreover a valid document respects the rules dictated by an XSD.

Figure 1:
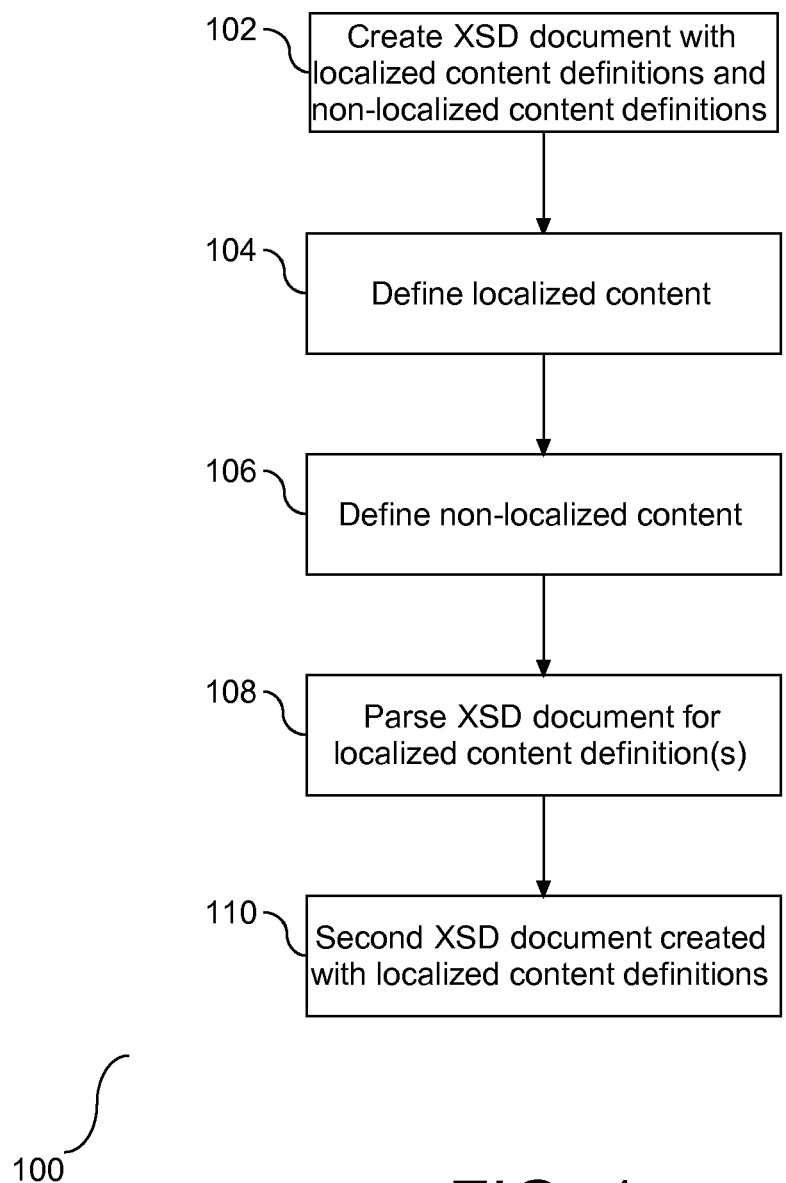
FIG. 1 is a flow chart illustrating processing of an XSD document that stores both localized and non-localized data content definitions to create a separate XSD document pertaining to the localized data content definitions according to the preferred embodiment of this invention, and is suggested for printing on the first page of the issued patent.

FIG. 1 is a flow chart (100) illustrating a method for processing an XSD document that stores both localized and non-localized data content definitions to create a separate XSD document pertaining to the localized data content definitions. Initially, an XSD document is created that is configured to include localized content definitions and non-localized content definitions (102). It should be understood that non-localized content definitions is a set of type and element definitions in the document that are global. In one embodiment, a special type may be employed to identify localized content. The special type follows the XSD structure. In one embodiment, the localized content definition may include an identifier attribute so that localized content can be correlated to the original document. During the creation of the XSD document, localized content is defined (104). In one embodiment, localized content may include a string type and/or an identifier attribute. During the creation of the XSD document, non-localized content, i.e. global content, is defined (106). Following completion of the XSD document at steps (104) and (106), the completed XSD document is processed to parse localized content definitions (108). More specifically, the processing of the document is limited to localized content definitions and does not address the non-localized content definitions. The processing of the XSD document at step (108) results in creation of a second XSD document pertaining to the localized content definitions of the original XSD document (110). In one embodiment, the original XSD document is referred to as a parent XSD document, and second XSD document is referred to as a child XSD document as it is created from the processing of the parent XSD document. Accordingly, as shown herein, the child XSD document pertains to extracted localized content definitions of the parent XSD document.

Following creation of the parent XSD document, an XML parent document corresponding to the parent XSD document may be created. An XSD document is a schema document, otherwise known as a metadata document. An XML document is a data document. Separate XML documents are created for the separate XSD documents. More specifically, a parent XML document is created for the parent XSD document, and a child XML document is created for a child XSD document. In one embodiment, more than one child XML document may be created for the child XSD document, as the child XML document stores data pertaining to the metadata structure of the XSD document. The child XML document stores specific data while maintaining the XML structure. Accordingly, data for the localized content definitions referenced in the child XSD document is stored in at least one corresponding child XML document.

Figure 2:
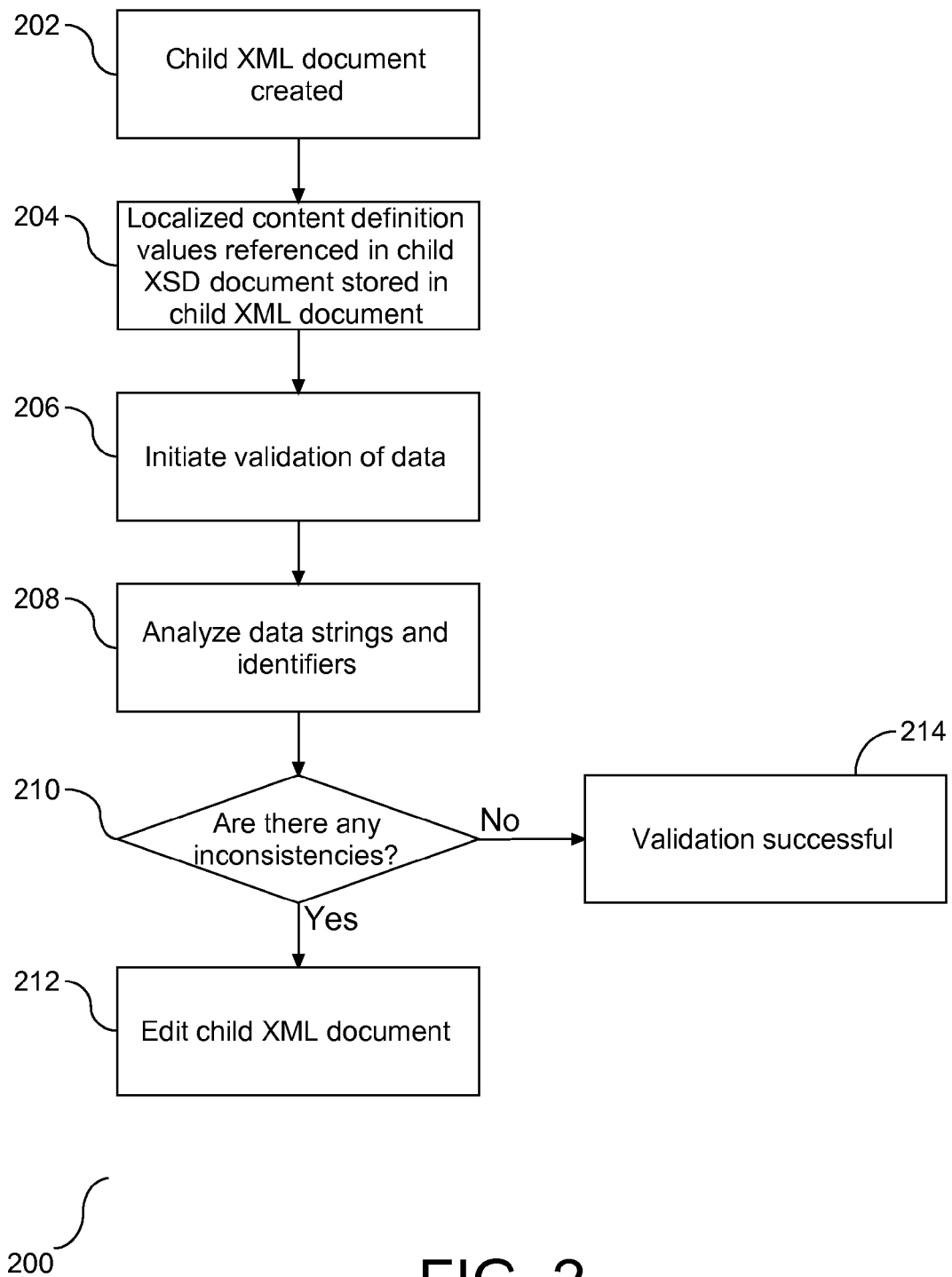
FIG. 2 is a flow chart illustrating a process for validating data of a child XML document.

FIG. 2 is a flow chart (200) illustrating a process for validating the data of the child XML document. As noted above, a child XML document is created to conform to the structure of the child XSD document (202). Values for localized content definitions referenced in the child XSD document are stored in the appropriately marked code of the child XML document (204). In one embodiment, the XML document is limited to storing a single value for each field. Once the creation of the child XML document is completed, the data stored in the appropriately marked code is validated with the child XSD document through a validation tool (206). The purpose of the validation of the document is to ensure that the child XML conforms to the child XSD document. XML validation tools are known in the art, and in one embodiment the invention should not be limited to a specific XML validation tool.

As a general matter and for illustrative purposes, the localized data definitions referenced in the child XSD document includes strings. The validation tool analyzes the strings and identifier (208) and determines if there are any inconsistencies between the strings and identifiers of the child XML document and the defined structure of the strings and identifiers in the child XSD document (210). If the response to the determination at step (210) is positive, the child XML document will need to be edited to correct the error(s) (212). Similarly, if the response to the determination at step (210) is negative, this is an indication that the child XML document properly identifies the string(s) of the localized content (214). Accordingly, creation of a child XSD document followed by creation of the corresponding parent and child XML documents supports both validation and searching of localized data through an XML validation tool.

As noted above, in one embodiment more than one child XML document that corresponds to the generated child XSD document may be created. In one embodiment, the localized data may pertain to strings values in one or more foreign languages. Each child XML document may pertain to a specific language. For example, there may be a first child XML document with string values translated into French, a second child XML document with string values translated into German, and a third child XML document with string values translated into Japanese. A benefit of storing the localized string values in a child XML document removes storing excess data in a single XML document. Another benefit is that the structure of the original XML document, and consequently its XSD need not be modified to accommodate the extra data. At the same time, the localized content can be queried and validated by XML tools without incurring performance penalty associated with an XML document with extraneous data. Accordingly, multiple child XML documents that correspond to the schema and structure of the child XSD document may be created.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, or store the program for use by or in connection with the instruction execution system, apparatus, or device.

Figure 3:
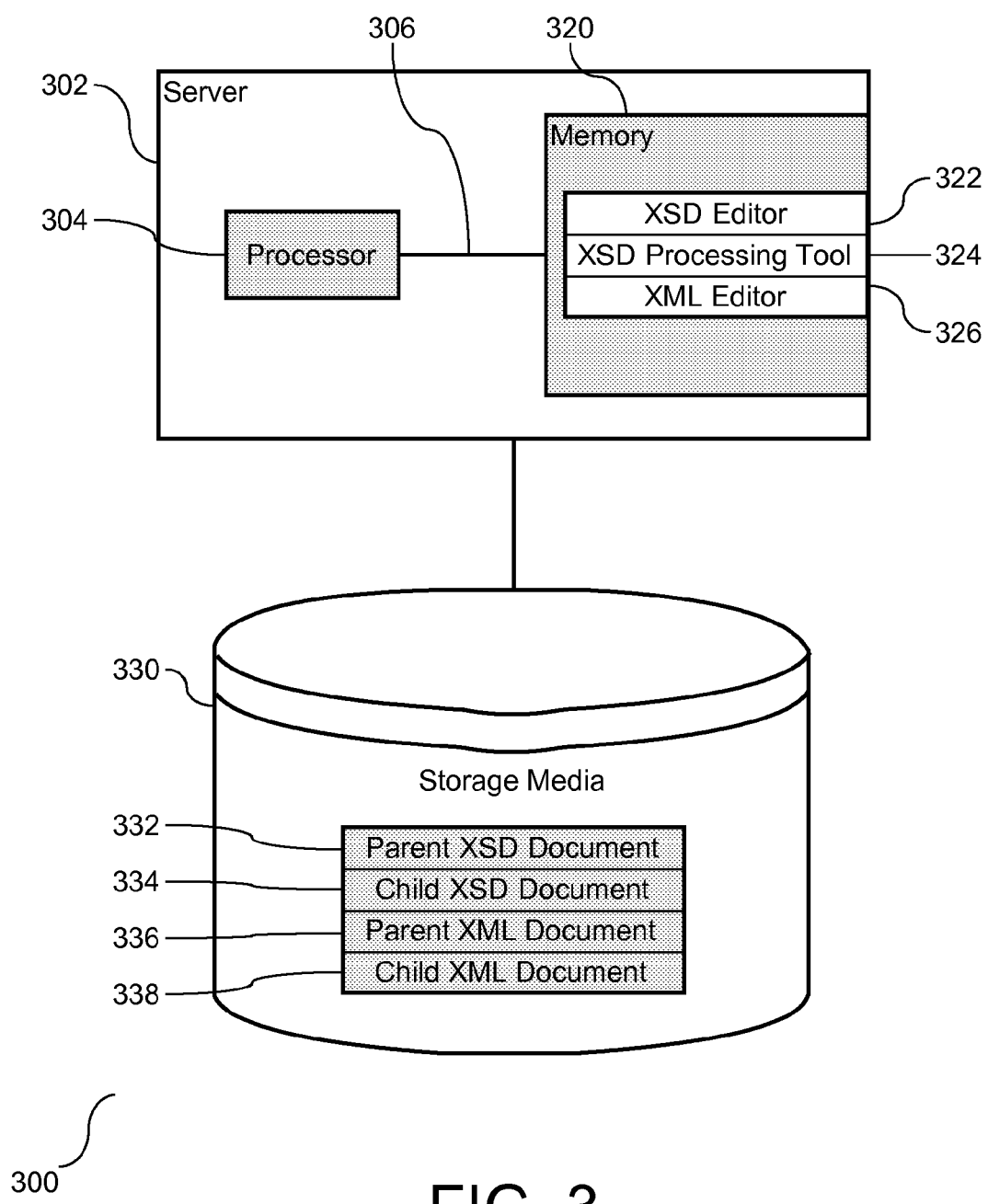
FIG. 3 is a block diagram illustrating a computer system with a tool for identifying and managing localized data of an XML document.

FIG. 3 is a block diagram (300) illustrating a computer system with a tool for identifying and managing localized data of an XML document. The illustration shows a server (302), with a processor unit (304) coupled to memory (320) by a bus structure (306) and in communication with storage media (330). In one embodiment, the storage media (330) may represent a plurality of storage devices. Similarly, although only one processor unit (304) is shown, in one embodiment the server (302) may include more processor units in an expanded design. It is known in the art to employ an editor to create an XSD document. As shown herein, the XSD editor (322) is local to the server (302). In one embodiment, the XSD editor (322) may be employed from a remote machine in communication with the server across a network. The XSD editor (322) is employed to create a first XSD document (332), shown in storage media (330). The first XSD document (332) is also known herein as a parent XSD. The parent XSD document (332) may include both localized content definitions and non-localized content definitions. An XSD processing tool (324) is provided and shown local to the server (302). The XSD processing tool (324) is in communication with the processor unit (304) and functions to identify localized content definitions in the parent XSD document (332). More specifically, the XSD processing tool (324) creates a second XSD document (334), also known as a child XSD document. The second XSD document (334) is derived from the parent XSD document (332) in that it is created by the XSD processing (324) tool which extracts only localized content definitions of the parent XSD document (332). It is known in the art to employ an editor to create an XML document, and it is further known in the art to create an XML document structured for an XSD document, wherein the created XML document contains data that conforms to the XSD document. An XML editor (326) is shown herein local to memory (320) and in communication with the processor unit (304). The XML editor (326) is employed to create a parent XML document (336) corresponding to the structure of and containing data that conforms to the parent XSD document (332), and to create a child XML document (338) corresponding to the structure of and containing data that conforms to the child XSD document (332). Although only one child XML document (338) is shown in the storage media (330), the invention should not be limited to a single child XML document (338) for the child XSD document (334). In one embodiment, there may be multiple child XML documents for each child XSD document (334), where each child XML document contains separate data to provide localized content for the child XSD document (334). Furthermore, although the XSD editor (322), XSD processing tool (324), and the XML editor (326) are each shown residing in memory, the invention should not be limited to this embodiment. In one embodiment, the XSD editor (322), XSD processing tool (324), and/or the XML editor (326) may reside as hardware tools external to memory (320), or it may be implemented as a combination of hardware and software. Furthermore, in one embodiment, the XSD editor (322), XSD processing tool (324), and/or the XML editor (326) may reside on a non-local machine, i.e. external to the server (302), and may communicate with the server through a network connection (not shown). Accordingly, the editors (322) and (326), and processing tool (324) may be implemented as a software tool or a hardware tool to facilitate processing of XSD documents to extract localized content definitions, and to create XML documents corresponding to the parent and processed XSD documents (332) and (334), respectively.

In one embodiment, the computer system is provided with a validation tool in communication with the processor. The validation tool serves to validate data in the child XML document with the child XSD document. Similarly, the validation tool also functions to validate data in the parent XML document with the parent XSD document. The validation tool may reside as a software or hardware element local to the server (302), or as a software or hardware tool remote from the server (302). The purpose of the validation tool is to ensure that the structure and data of the separate XML document(s) fall within the structure and data constraints of the associated XSD document(s).

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, DVD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or, I/O devices, (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages Over the Prior Art

Metadata content of an XSD document is categorized into at least two primary elements of classification, referred to herein as localized content definitions and non-localized content definitions. A tool is employed to process the XSD document and to create a child XSD document pertaining to the localized content definitions. Both the localized and non-localized content definitions remain in the processed XSD document. Thereafter, at least two separate XML documents are created, one to contain data for the processed XSD document, and a second to contain data for the child XSD document. The creation of the child XSD document and the corresponding child XML document enables the localized content to be maintained within the XML structure, but in a separate document. The corresponding child XML document can be validated with an XML validation tool, and it can also be queried and searched in a manner comparable to all XML documents. The child XSD document and the child XML document maintain the same schema as their corresponding parent documents. Accordingly, by parsing out the localized content into a separate document possible degradation in processing and performance of the parent document is mitigated.

Alternative Embodiments

It will be appreciated that, although specific embodiments of the invention have been described herein for purposes of illustration, various modifications may be made without departing from the spirit and scope of the invention. In particular, in one embodiment, the localized data of the child XML document is isolated from the global data of the parent XML document. Accordingly, the scope of protection of this invention is limited only by the following claims and their equivalents.

We claim:

1. A method for storing localized values in an XML document comprising:
   creating a first XSD document for a first XML document, said first XSD document including localized content definitions and non-localized content definitions wherein localized content structure corresponds to the localized content definitions and non-localized content structure corresponds to the non-localized content definitions;
   identifying all localized content definitions in the first XSD document;
   processing the first XSD document to create a second XSD document, wherein the step of processing the first XSD document extracts only the identified localized content definitions, the second XSD document having a structure identical to the structure of the localized content definitions of the first XSD document; and
   storing a localized value corresponding to one of the localized content definitions in the first XML document in a separate child XML document corresponding to the second XSD document.

2. The method of claim 1, further comprising validating data in the separate child XML document with the second XSD document.

3. The method of claim 1, further comprising creating the first XML document within the structure of the first XSD document, wherein the first XML document includes localized and non-localized content.

4. The method of claim 3, further comprising validating content in the first XML document with the first XSD document.

5. The method of claim 1, wherein the step of storing a localized value for each localized content definition in a separate child XML that conforms to the second XSD document isolates the localized content into a separate child XML document that can be queried and validated by an XML query and validation tool.

6. The method of claim 1, further comprising augmenting each localized content definition with an identifier, and correlating the localized content to original content.

7. A computer system, comprising:
 a processor in communication with memory and storage media;
 an XSD creation tool in communication with said processor, said XSD creation tool to create a first XSD document for a first XML document, said first XSD document including localized and non-localized content definitions wherein localized content structure corresponds to the localized content definitions and non-localized content structure corresponds to the non-localized content definitions;
 an XSD processing tool in communication with said processor to identify all localized content definitions in the first XSD document and to create a second XSD document, wherein the XSD processing tool extracts the identified localized content definitions, the second XSD document having a structure identical to the structure of the localized content definitions of the first XSD document; and
 an editor in communication with said processor to create a second XML document and to store localized values corresponding to one of the localized content definitions in the first XML document for each identified localized content definition in the second XML document, wherein the structure of the second XML document falls within the structure of the second XSD document.

8. The system of claim 7, further comprising a validation tool in communication with said processor, the validation tool to validate content in the second XML document with the second XSD document.

9. The system of claim 7, further comprising an editor in communication with the processor, the editor being employed to create the first XML document within the structure of the first XSD document, wherein the first XML document includes localized content.

10. The system of claim 7, wherein the second XML that stores a localized value for each localized content definition conforms to the second XSD document, isolates the localized content into the second XML document that supports a query and validation by an XML query and validation tool.

11. The system of claim 7, further comprising an identifier to augment each localized content definition, wherein the identifier correlates localized content to original content.

12. An article comprising:
 a computer readable data storage device including computer program instructions configured to store localized values in an XML document comprising:
 instructions to create a first XSD document for a first XML document, said first XSD document including localized content and non-localized content definitions wherein localized content structure corresponds to the localized content definitions and non-localized content structure corresponds to the non-localized content definitions;
 instructions to identify all localized content definitions in the first XSD document;
 instructions to process the first XSD document to create a second XSD document, wherein the instructions to process the first XSD document extracts the identified localized content definitions, the second XSD document having a structure identical to the structure of the localized content definitions of the first XSD document; and
 instructions to store a localized value corresponding to one of the localized content definition in the first XML document for each identified content definition in a separate child XML document, wherein the structure of the separate child XML document falls within the structure of the second XSD document.

13. The article of claim 12, further comprising instructions to validate data in the separate child XML document with the second XSD document.

14. The article of claim 12, further comprising instructions to create the first XML document within the structure of the first XSD document, wherein the first XML document includes localized content and non-localized content.

15. The article of claim 14, further comprising instructions to validate content in the first XML document with the first XSD document.

16. The article of claim 12, wherein the instructions to store localized values for the localized content definition in a separate child XML that conforms to the second XSD document isolates the localized content into a separate child XML document that can be queried and validated by an XML query and validation tool.

17. The article of claim 12, further comprising instructions to augment each localized content definition with an identifier and to correlate the localized content to original content.

* * * * *